United States Patent Office 3,531,713
Patented Sept. 29, 1970

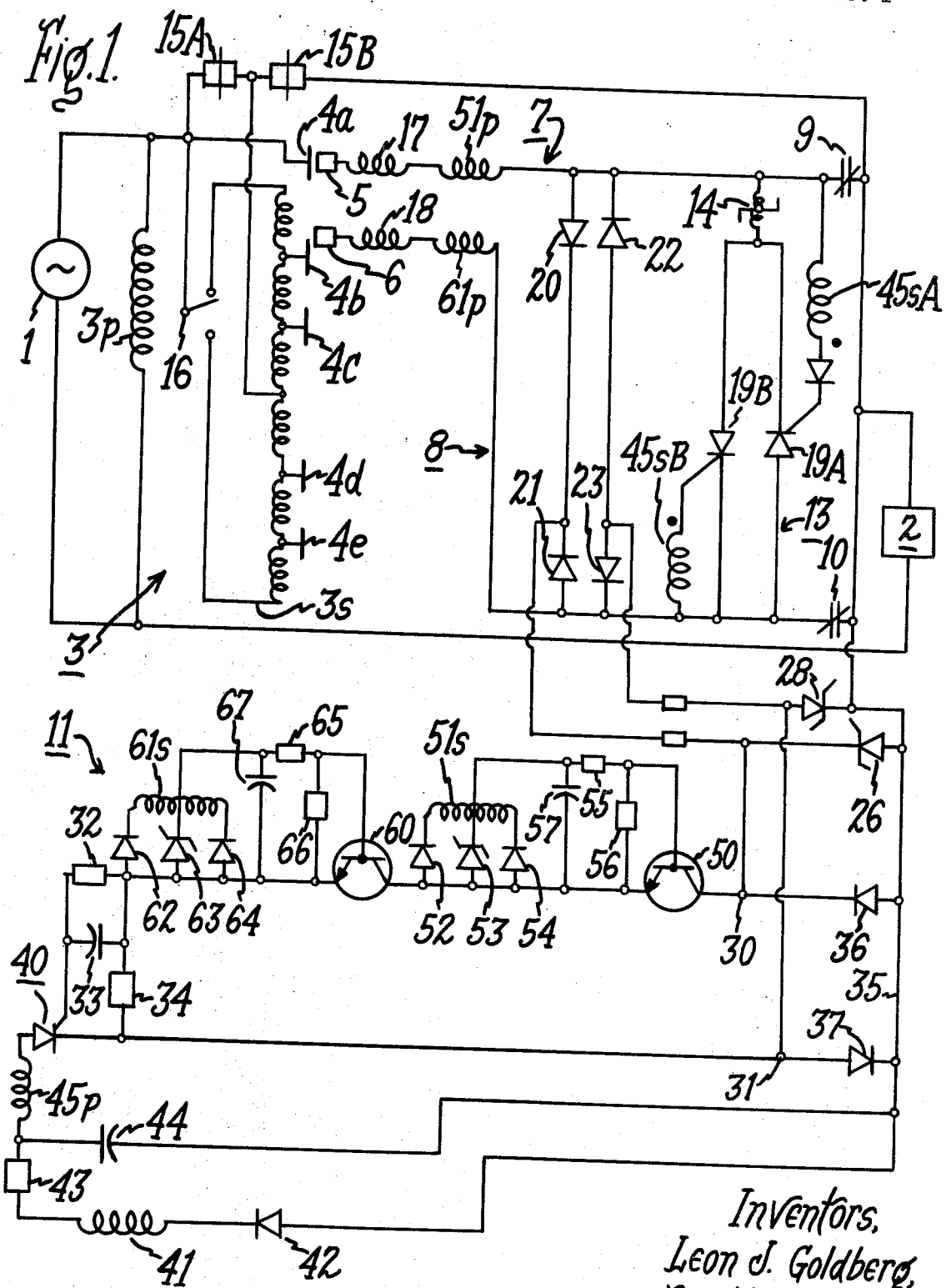

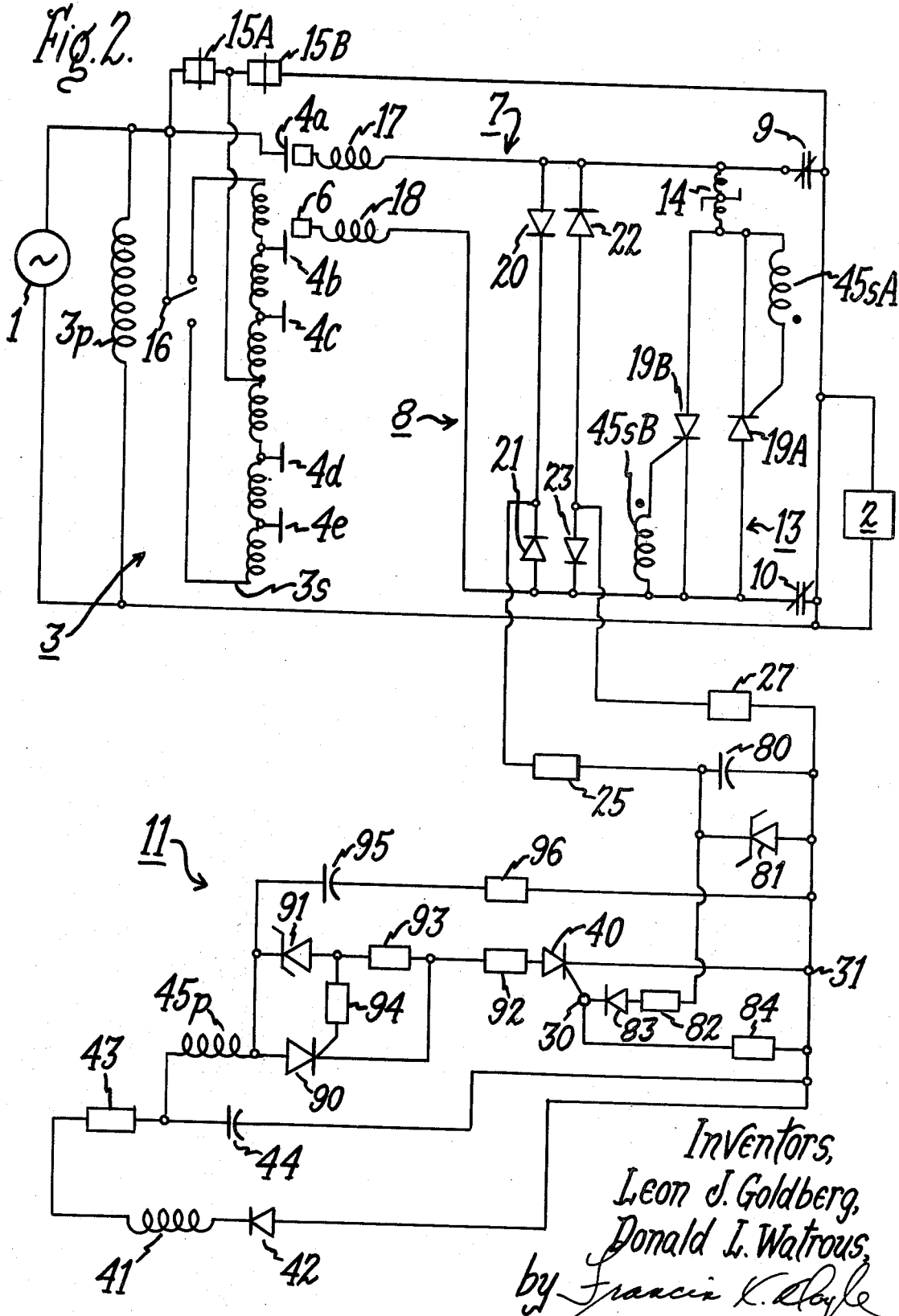

3,531,713
NON-ARCING TAP CHANGING SYSTEM
Leon Joseph Goldberg, Schenectady, and Donald L. Watrous, Syracuse, N.Y., assignors to General Electric Company, a corporation of New York
Filed Dec. 16, 1968, Ser. No. 783,811
Int. Cl. H02m 5/12; H02p 13/06
U.S. Cl. 323—43.5
8 Claims

ABSTRACT OF THE DISCLOSURE

A tap changing system for connection between a source and a load. A solid state interrupter connected between two circuit branches, each of which couple a transformer tap to the load, is closed by a control circuit in response to the opening of a mechanical contactor in one circuit branch, and opens at the next source current zero to electrically remove one branch from the tap changing circuit. The branch circuit including the opened contactor may then be arclessly disconnected from one transformer tap and coupled to another.

BACKGROUND OF THE INVENTION

This invention relates to transformer tap changing systems. More specifically, it relates to arcless tap changing systems including an electronically operated interrupter in the tap changing circuit.

Tap changing systems are particularly useful in voltage regulating systems and in tap changing for electrical distribution transformers. A typical tap changing system includes a transformer having an exciter, or primary, winding which is connected across a source and coupled to a secondary having a plurality of taps. One terminal of the primary winding is connected to one terminal of a load.

The other terminal of the load is connected to the secondary winding by a tap changing circuit which includes two branch circuits, each of which are connected between one tap and the load. A contact is included at the end of each branch circuit, and is placed on a tap to connect a portion of the secondary to the load. The contacts may be placed on the same or adjoining taps. A mechanical drive system moves a contact from one tap to the next when it is desired to change the voltage provided to the load.

In order to provide for arcless tap changing, a normally closed pair of contacts is connected in each branch circuit, and a normally open interrupter switch is connected between the two branch circuits. When it is desired to arclessly change a tap connection, the contact pair in a first branch is opened, and the interrupter is closed. Current flows from the contact in the first branch through the interrupter and the contact pair in the other branch to the load. When the interrupter is opened, current flow ceases in the first branch, and the entire load current flows from the tapped secondary through the other branch. Since no current flows through the first branch, the contact therein may be arclessly removed from the transformer tap to which it is connected and moved to another tap by a mechanical drive system which is synchronized to operate after the opening of the contact pair.

Typical prior art tap changing systems include a mechanical interrupter which is generally driven by a complex gear system having several moving parts. While arcing across the contact-tap connection is prevented, an arc may still appear across the interrupter contacts. Generally, there are several pounds of contact pressure between the interrupter contacts so that it is generally impossible to operate the interrupter with any great speed. It is virtually impossible to synchronize the opening of the interrupter with rising or falling currents in the branch circuits so that deleterious effects of high currents through the interrupter at the time of interruption can be avoided. While the recent innovation of the use of solid state semi-conductor switches as interrupters has alleviated the problems caused by arcing across the interrupter contacts, the problems which accrue due to the use of generally complicated interrupter drive mechanisms have not been alleviated.

In addition, it is also desirable to close the interrupter before an arc can develop across the pair of contacts. In a typical system, pressure between the contacts may be two or three pounds. As the contact pair is opened, the voltage drop thereacross increases. The surfaces of the contacts are heated sufficiently to become plastic, and if the interrupter is not closed before a voltage drop across the contact pair sufficient to cause arcing is reached, an arc will appear. Even in a typical system where the frequency of the source current is only 60 HZ, it requires only a short time for this arcing voltage to be reached. It is extremely difficult to mechanically synchronize the interrupter to close before the mechanical contactors' arcing voltage is reached by mechanical means.

It is therefore an object of the present invention to provide an arcless tap changing system including an electronically operated interrupter.

It is a specific object of the present invention to provide a tap changing system of the type described in which an interrupter is closed in response to increasing voltage drop across a contact pair.

It is also a specific object to provide a system of the type described in which arcing across contact pairs is eliminated.

It is a further object of the present invention to provide a tap changing system of the type described in which the arcless tap changing is achieved with maximum speed.

It is yet a further object of the present invention to provide a tap changing system of the type described which is simple in construction and reliable in operation.

SUMMARY OF THE INVENTION

Briefly stated, in accordance with the present invention, there is provided a tap changing system including a controlled solid state interrupter connected between two branch circuits which couple transformer taps to a load. A control circuit operates in response to the voltage drop due to the opening of a contact pair in a circuit branch to close the interrupter, and the interrupter is opened in response to the branch zero current following the half cycle during which the contact pair is opened.

BRIEF DESCRIPTION OF THE DRAWINGS

The foregoing objects and features of novelty which characterize the invention are pointed out with particularity in the appended claims. Various embodiments of the invention, its advantages, and specific objects attained with its use may be better understood by reference to the following description in conjunction with the following drawings.

Of the drawings:
FIG. 1 is a schematic representation of an apparatus constructed in accordance with the present invention;
FIG. 2 is a schematic representation of a further embodiment of the present invention.

DESCRIPTION OF THE PREFERRED EMBODIMENTS

In the tap changing system shown in FIG. 1 a transformer 3, including an exciter, or primary, winding 3p and a tapped secondary 3s couples a source 1 to a load 2. Voltage regulation is achieved by selectively connecting the load 2 to a neutral tap 4a, connected to the secondary 3s. While the secondary 3s is shown as including four taps, a typical secondary might include eight or some other number of taps. Contacts 5 and 6, included in branch circuits 7 and 8 respectively, each connect one of the taps to one terminal of the load 2, and current flows through each branch during normal operation. When it is desired to connect a different portion of the tapped secondary to the load 2 by removing a contact from one tap and placing it on another, for example contact 5, a contact pair 9, connected in series in the branch circuit 7, is opened, and as it opens the voltage drop across the contact pair 9 increases. This voltage drop is applied to a control circuit 11 which produces a pulse. This pulse is coupled to gate a normally open solid state interrupter 13, which is connected between the branches 7 and 8 to conduct in place of the opened contact pair. Following the closing of the interrupter 13, current flows from the contact 5 through the branch circuit 7, the interrupter 13 and a contact pair 10, connected in series in the branch circuit 8 to the load 2. The interrupter 13 continues to conduct until the current zero following the half-cycle during which the contactor 9 is opened. When the interrupter 13 reopens, the branch 7 is opened, and current ceases to flow therethrough. Since no current flows in the branch circuit 7, the contact 5 may be removed from the tap with no resultant arc, and may be placed on another tap.

If desired, a pair of Thyrite resistors 15A and 15B may be connected between the tapped secondary 3s and the load 2 to protect the circuit in case of an overload present in the source. A single pole-double throw switch 16 may be connected between the tapped secondary circuit 3s and neutral tap 4a so that either bucking or boosting voltages may be provided. In addition, reactors 17 and 18, having a common core are connected in series in branch circuits 7 and 8, respectively, in order to limit the amount of current circulating within the branch circuits 7 and 8, the contact pairs 9 and 10, and the portion of the winding 4 connected in the circuit by the contacts 5 and 6.

The interrupter 13 comprises a bilateral thyristor arrangement. When a pulse is coupled to the interrupter 13, it shunts current from one contact pair 9 or 10 to the other, whether the interrupter closing takes place during the positive half-cycle or negative half-cycle of source voltage, and continues to conduct until the next source current zero. In the circuit shown in FIG. 1, the solid state interrupter 13, which is connected between the branch circuits 7 and 8, comprises SCR's 19A and 19B which are connected in inverse parallel relationship. When the control circuit 11 produces a gating pulse, either SCR 19A or SCR 19B shunts the source voltage from one branch 7 or 8 to the other to provide unilateral operation in either direction, or in effect, bilateral operation of the interrupter 13. In addition, a reactor 14 may be connected between both SCRs 19A and 19B and one branch circuit 7 or 8 in order to delay the rise of current through the SCR's and avoid the effect of excessive $di/dt$ under worst switching angle conditions. As seen in FIG. 1, the reactor 14 is connected between the cathode of SCR 19A and the anode of SCR 19B and the branch circuit 7. In the present arrangement, due to its operating characteristics, the interrupter 13 turns off when the A–C current flowing therethrough goes to zero. If desired, however, appropriate circuitry could be included to force the interrupter 13 to turn off prior to the current zero.

In order to provide for electronic sensing of the opening of either contact pair 9 or 10, a full-wave bridge comprising series-connected diodes 20 and 21 and series connected diodes 22 and 23 is connected between the branches 7 and 8. A resistor 25 is connected between the junction of the diodes 20 and 21, and a terminal 30 of the control circuit 11. This arrangement provides for coupling the voltage that appears across the branch circuits 7 or 8 if contact pair 9 or 10 respectively is opened during the positive cycle of source voltage, when the potential at the source 1 is positive with respect to the potential at the conductor 35. Similarly, a resistor 27 is connected between the junction of the diodes 22 and 23 and a terminal 31 of the control circuit 11 to couple the voltage appearing across branch circuit 7 or 8 if contact pair 9 or 10 is opened during the negative half cycle of the source voltage when the potential at the source 1 is negative with respect to the potential at the conductor 35. A Zener diode 26 limits the voltage delivered from the resistor 25 to the terminal 30, while a Zener diode 28 limits the voltage delivered from the resistor 27 to the terminal 31.

The voltage appearing at terminal 30 is conducted to the gate of an SCR 40 included within the control circuit 11 through the collector-emitter circuits of transistors 50 and 60, which are connected in series, and through a coupling circuit comprising parallel-connected resistor 32 and capacitor 33. Additional circuit elements 51–57 and 61–67 are included to control the conduction of the transistors 50 and 60 after the SCR 40 has been gated. An analysis of these circuit elements follows the description of the circuitry through which gating of the SCR 40 and operation of the interrupter 13 is achieved.

In order to gate the SCR 40, the gate of the SCR 40 must be at a higher potential than the cathode. In the absence of a voltage at either of the input terminals 30 or 31 of the control circuit 11, both the gate and the cathode of the SCR 40 are of the same potential as the conductor 35. A blocking diode 36 is connected between the input terminal 30 and the conductor 35 and poled so that when a positive voltage appears at the input terminal 30, the potential of the gate of SCR 40 is raised with respect to the potential at the cathode, so that the SCR 40 is gated. A blocking diode 37 is provided with its anode connected to the input terminal 31 and its cathode connected to the conductor 35, so that when a negative voltage appears at the input terminal 31, the potential at the cathode of the SCR 40 is depressed with respect to the potential at the gate so that gating is also achieved. A resistor 34 may be connected between the cathode and the gate of the SCR 40 in order to clamp the gate to the cathode when no voltage is delivered from the bridge comprising the diodes 20–23 through the transistors 50 and 60 to the gate of SCR 40.

The function of the control circuit 11 is to produce an output pulse when the SCR 40 is gated. A separate D-C source is provided within the control circuit 11 which may, for example, comprise an A-C secondary transformer 41 coupled to a primary winding (not shown) and connected in series with a rectifying diode 42. The D-C source comprising the winding 41 and the diode 42 is connected across a charging resistor 43 and a capacitor 44. The anode of SCR 40 is coupled to one terminal of capacitor 44 so that when the SCR 40 is gated, the capacitor 44 discharges therethrough. A primary winding 45p of a pulse transformer having two secondary windings, 45sA and 45sB, is connected in series between the capacitor 44 and the anode of the SCR 40 so that when the SCR 40 is gated, a pulse appears across the primary winding 45p. This pulse is coupled to secondary windings 45sA and 45sB, which are included in the interrupter 13. Secondary pulse transformer winding 45sA is connected between the branch circuit 7 and the gate of SCR 19A, while secondary winding 45sB is connected between the branch circuit 8 and the gate of SCR 19B, so that the gating pulse produced by the control circuit 11 is coupled to the interrupter 13.

If the interrupter is gated in response to the opening of the contact pair 9 during a positive half-cycle of source voltage, current is diverted from the branch circuit 7 through the SCR 19B. The SCR 19A diverts the current if the contact pair 9 is opened during the negative half-cycle. Similarly, after the opening of the contact pair 10, the SCR 19A diverts current during a positive half-cycle and the SCR 19B diverts current during a negative half-cycle. In this manner, the interrupter 13 operates bilaterally.

The SCR 19A or 19B which diverts branch current continues to conduct until the next source current zero, and then turns off. The interrupter function is then completed. It is necessary to prevent the interrupter from reclosing during the remainder of the tap changing operation during which a mechanical drive system (not shown) moves the contact 5 or 6 in the branch circuit 7 or 8 including the opened contact pair 9 or 10 from one tap, 4a, 4b, 4c, 4d, or 4e to the next. To this end, the transistors 50 and 60 and associated circuitry are provided.

The emitter-collector circuit of transistors 50 and 60 are connected in series between the terminal 30 and the coupling circuit comprising parallel connected resistor 32 and capacitor 33, through which voltage is applied to the gate of the SCR 40. A secondary winding 51s of a control transformer is connected in the base circuit of transistor 50 and coupled to a primary control transformer winding 51p in the branch circuit 7, so that a signal is provided to turn the transistor 50 on when current is flowing through the branch circuit 7. Similarly, turn-on voltage is provided to the base of the transistor 60 by a secondary winding 61s of a control transformer, which is coupled to a primary control transformer winding 61p connected in series in the branch circuit 8. The primary windings 51p and 61p provide A-C voltages to the secondary windings 51s and 61s. Diodes 52 and 54 are connected between the secondary winding 51s and the emitter of transistor 50 to rectify the A-C signal across secondary winding 51s. Similarly, diodes 62 and 64 are connected to provide full-wave rectification for the A-C signal appearing across secondary winding 61s. Zener diodes 53 and 63 may be connected between the emitters of the transistors 50 and 60 and the windings 51s and 61s, respectively, in order to limit the voltage applied to the base of transistors 50 and 60. Resistor 55 is connected between the center tap of secondary winding 51s, and the base input circuit of transistor 50 and resistor 56 is connected across the emitter-base circuit of the transistor 50 to divide the voltage applied thereto. Similarly, resistors 65 and 66 are provided between the center tap of secondary winding 61s and the emitter of the transistor 60, respectively.

Once a contact pair 9 or 10 has been opened and the interrupter 13 has been operated, either the branch circuit 7 or 8 is opened. If branch circuit 7 is opened, current ceases to flow through the winding 51p so that the transistor 50 is turned off. If the branch circuit 8 is opened, current ceases flowing through the winding 61p so that the transistor 60 is turned off. When either transistor 50 or 60 is turned off, the circuit between the terminal 30 and the gate of the SCR 40 is opened so that no positive potential can appear at the gate of the SCR 40. The SCR 40 thus cannot be gated until the opened branch circuit 7 or 8 is reclosed and conduction is re-established in both the transistors 50 and 60.

Under normal operating conditions, when no tap changing is performed, the transistors 50 and 60 are turned on by the signals applied to their bases by secondary windings 51s and 61s, respectively in response to the current flowing through the primary windings 51p and 61p. When the transistors 50 and 60 are on, they are capable of conducting a gating voltage to the SCR 40. However, when the voltage in either branch 7 or 8 is in the immediate region of a zero crossing, the voltage applied to the bases of transistors 50 and 60 falls below the threshold turn-on voltage so that the transistors turn off. Since the control circuit 11 cannot operate to gate the SCR 40 and the interrupter 13 when either transistor is off, it is desirable to minimize the period of time during which either transistor 50 or 60 is off. Therefore, a capacitor 57 is connected between the resistor 55 and the rectifying diodes 52-54, and a capacitor 67 is connected between resistor 65 and rectifying diodes 62-64 to hold the minimum voltage applied to the bases of the transistors 50 and 60 to a value just below the threshold current required to turn either transistor 50 or 60 on.

When a high current is flowing through a branch circuit, the opening of either contact pair 9 or 10 during an early part of the source current cycle may have a deleterious effect on the SCRs 19A and 19B included in interrupter 13. In order to prevent the interrupter 13 from closing during the peak current portion of the source current cycle, control windings 51p and 51s and control windings 61p and 61s may be made saturable, so that no input voltage is delivered to the bases of transistors 50 and 60 during the high current portions of the cycle in which a contactor is opened. However, as the current decreases toward the end of a half-cycle, windings 51s and 61s once again apply an input current to the bases of transistors 50 and 60, respectively, so that the interrupter 13 closes in response to the opening of a contact pair.

SUMMARY OF OPERATION

Summarizing the operation of the circuit, if either contact pair 9 or contact pair 10 is opened, for example, during the positive half-cycle of source current, a positive voltage appears at the terminal 30. This voltage is conducted through the series-connected collector-emitter circuits of the transistors 50 and 60 to the coupling circuit comprising resistor 32 and capacitor 33 to the gate of SCR 40 so that the control circuit 11 produces an output which is coupled to close the interrupter 13. If either contact pair 9 or 10 is opened during the negative half-cycle of source voltage, the negative drop is applied to the terminal 31 of the control circuit 11 and depresses the voltage at the cathode of the SCR 40 with respect to the potential at the gate in order to gate the SCR 40 and consequently operate the interrupter 13. Once the interrupter 13 is closed, and one of the SCR's 19A and 19B is rendered conductive, the interrupter continues to conduct until the next current zero in the branch including the contact pair which was opened.

Thus if it is desired to remove contact 5, for example, from a tap, contact pair 9 is opened, and the control circuit 11 closes the interrupter 13. When the next current zero of the current flowing through the branch 7 is reached, the current in the primary winding 51p goes to zero and the transistor 50 turns off, so that no gate voltage can be applied to the SCR 40. Since SCR 40 cannot conduct, no pulse can flow from capacitor 44 through primary pulse transformer winding 45p, and the control circuit 11 is disabled, and prevented from operating the interrupter 13. With contact pair 9 and interrupter 13 opened, branch circuit 7 is effectively disconnected from the tap changing circuit so that no current flows therethrough. Since no current is flowing through the branch 7, contact 5 may be removed by the mechanical tap changing apparatus (not shown) from the tap 4a, 4b, 4c, 4d or 4e on which it is placed and moved to another tap, and normal circuit operations may be resumed.

It is seen that the interrupter 13 is closed in response to the increasing voltage drop across one of the contact pair 9 or 10 as it is opened. The entire diversion of current from the opening contact pair 9 or 10 to the closed interrupter 13 may be accomplished during a time period in the order of 10 microseconds. The present circuit thus provides for reliable interrupter closing more rapidly than that which could be obtained through the utilization of mechanical means. Since the interrupter is gated in response to the voltage drop in a contact pair, no imprecision in the timing of the closing of the interrupter which might allow an arc to form across the contactors can result. This circuit is far superior to a purely mechanical system in that a contact may be moved from one tap to another virtually immediately. Mechanical synchronization to achieve this operation would be difficult if not impossible.

Another form of the present invention is schematically represented in FIG. 2. Reference numerals which denote elements corresponding to those shown in FIG. 1 and which perform the same function bear the same reference numerals. In FIG. 2, primary control transformer windings 51p and 61p are not included in the branch circuits 7 and 8 respectively. Refiring of the gating circuit after the interrupter has been closed and then opened and before the tap changing operation is completed is prevented in a different manner.

In this arrangement, as in that shown in FIG. 1, the interrupter 13 is closed by discharging the capacitor 44 through the pulse transformer primary winding 45p and SCR 40. The SCR 40 is gated by raising the potential at the gate with respect to the potential at the cathode. If either contact pair 9 or 10 is opened during the positive half-cycle of source voltage, the resulting signal is conducted from the bridge portion consisting of diodes 20 and 21 through the resistor 25 and coupled to the gate of the SCR 40 by a resistor 82 and a directing diode 83. If either contact pair 9 or 10 is opened during the negative half-cycle of source voltage, the resulting negative signal is conducted from the bridge portion consisting of diodes 22 and 23 through the resistor 27 to the cathode of the SCR 40 so as to depress the voltage at the cathode and gate the SCR 40.

A capacitor 80 is connected between the resistors 25 and 27 to absorb noise peaks present in the circuit, and a Zener diode 81 is connected in parallel with the capacitor 80 to limit the voltage that may be applied by either of the resistors 25 or 27 to the SCR 40. A resistor 84 may be connected between the gate and the cathode of SCR 40 to provide clamping when no SCR gating signal is present.

The SCR 40 is prevented from reclosing immediately after the interrupter 13 has closed and then opened, to permit the remainder of the tap changing operation to take place, by electrically disconnecting it from the capacitor 44 and primary pulse transformer winding 45p. An SCR 90 is connected in series between the SCR 40 and winding 45p, and a Zener diode 91 is coupled between the capacitor 44 and the gate of the SCR 90. The Zener diode 91 is selected to break down at the voltage at which the capacitor 44 is to be charged. When capacitor 44 is charged to the value determined by the resistor 43, the potential appearing at the positive terminal of the capacitor 44 appears at the cathode of the Zener diode 91. The Zener diode 91 breaks down to apply a potential to the gate of the SCR 90 and render the SCR 90 conductive. When the SCR 90 is gated, the primary pulse transformer winding 45p and the capacitor 44 are connected to the SCR 40.

In this manner, the control circuit is disabled until the capacitor 44 recharges sufficiently to break down the Zener diode 91. The values of the resistor 43 and the capacitor 44 are chosen so that the recharging of the capacitor 44 takes longer than the completion of the tap changing operation after the SCR 40 has been gated. When the capacitor 44 is recharged, gating of the SCR 40 by voltages appearing at the terminals 30 or 31 again results in operation of the interrupter 13 as in the circuit shown in FIG. 1.

A resistor 93 is connected between the cathode of the Zener diode 91 and resistor 92 to determine the voltage applied to the gate of SCR 90 by Zener diode 91. A resistor 94 may be connected between the gate of SCR 90 and resistor 93 to clamp the Zener diode when no gating signal is present. A capacitor 95 and a resistor 96 may be connected in series between the input terminal 31 and the SCR 90 to dissipate stray noise signals and prevent false firing of the SCR.

SUMMARY OF OPERATION

In operation, after SCR 40 is gated and control circuit 11 operates to close the interrupter 13, capacitor 44 fully discharges. The circuit is incapable of again gating the SCR 40 until capacitor 44 recharges to a value sufficient to break down the Zener diode 91. Gating of the SCR 40 thus cannot take place until after the tap changing operation has been completed. The time constant of charging resistor 43 and capacitor 44 is selected so that the time required to charge the capacitor 44 to a level sufficient to break down the Zener diode 91 is greater than the duration of the completion of the tap changing operation.

It is thus seen that the present invention provides a tap changing system in which reliable operation is assured due to synchronization of the operating components with the changes of current in the branch circuits 7 and 8 due to the opening of the contact pairs 9 or 10 and the opening and closing of the interrupter circuit 13. The duration of the entire electronic switching operation is in the order of ten microseconds. Due to the rapid operation of the circuit, arcing across contact pairs 9 and 10 is prevented due to diversion of current through the SCR's. It is thus seen that the present invention provides better performance, greater reliability, and more rapid operation than could be obtained with a mechanically operated system.

What is claimed as new and desired to be secured by Letters Patent of the United States is:

1. An arcless transformer tap changing system for connection between an AC source and a load comprising in combination:
   (a) a transformer winding for coupling to said source, and having a plurality of taps;
   (b) a first branch circuit connected between said load and one of said taps, and including a normally-closed first contact pair connected in series therein;
   (c) a second branch circuit connected between said load and one of said taps, and including a second normally-closed mechanical contact pair connected in series therein;
   (d) a normally-open controlled bilaterally conductive thyristor interrupter connected between said first and second branch circuits;
   (e) a sensing circuit connected to said contact pairs having at least one output terminal at which a voltage appears when one of said contact pairs is opened;
   (f) a control circuit having an input coupled to the output of said sensing circuit for producing an output signal in response to a voltage at the output of said sensing circuit;
   (g) means for coupling the output signal of said control circuit to said controlled bilaterally conductive thyristor interrupter for closing said interrupter; and
   (h) means for disabling said control circuit after said interrupter is opened.

2. An apparatus as defined in claim 1 in which said sensing circuit comprises a full-wave bridge connected between said first and second branch circuits.

3. An apparatus as defined in claim 2 in which:
   (a) said bilaterally conductive controlled thyristor interrupter comprises first and second controlled rectifiers connected in inverse parallel relationship, each having a gate coupled to the output of said control circuit.

4. An apparatus as defined in claim 3 wherein the output of said control circuit is a pulse, and the pulse-producing portion of said control circuit comprises:
   (a) a capacitor for charging by a source; and
   (b) a third controlled rectifier connected across said capacitor having its anode and cathode connected to provide a discharge path for said capacitor and having its gate connected to the input of said control circuit.

5. An apparatus as defined in claim 4 wherein said means for coupling the output of said control circuit to control said interrupter comprises:
   (a) a primary pulse transformer winding connected in series between said third controlled rectifier and said capacitor; and (b) a first secondary pulse transformer winding connected between the control electrode of said first controlled rectifier and said first branch circuit, and a second secondary pulse transformer winding connected between the control electrode of said second controlled rectifier and said second branch circuit.

6. An apparatus as defined in claim 5 wherein said means for disabling said control circuit after said interrupter is closed comprises:
(a) a first control transformer having a first primary winding connected in series in said first branch circuit, and having a first secondary winding;
(b) a second control transformer having a second primary winding connected in series with said second branch circuit, and having a second secondary winding; and
(c) first and second unilateral conductive devices connected in series between the input of said control circuit and the gate of said controlled rectifier in said control circuit, said first unilaterally conducting device connected to be rendered conductive by said first secondary winding, and said second unilateral conductive device connected to be rendered conductive device connected to be rendered conductive by said second secondary winding.

7. An apparatus as defined in claim 5 wherein said means for disabling said control circuit after said interrupter is closed comprises:
(a) a fourth controlled rectifier connected between said third controlled rectifier and said primary pulse transformer winding;
(b) a unilateral conductive breakdown device connected between said capacitor and the gate of said fourth controlled rectifier for preventing condition of said fourth controlled rectifier until said capacitor recharges the breakdown voltage of said device.

8. An arcless transformer tap changing system for connection between an AC source and a load comprising in combination:
(a) a transformer winding for coupling to said source and having a plurality of voltage regulating taps;
(b) a branch circuit for connecting one of said taps to said load, and including a normally-closed contact pair;
(c) a controlled bilaterally conductive thyristor interrupter connected across said contact pair;
(d) a sensing circuit connected across said contact pair having an output terminal at which a voltage appears when said contact pair is opened;
(e) a control circuit having an input coupled to the output of said sensing circuit for producing an output signal when a voltage appears at the output of said sensing circuit;
(f) means coupling the output of said control circuit to said controlled bilaterally conductive thyristor; and
(g) means responsive to the output of said control circuit for preventing the coupling of a control signal to said interrupter after said control circuit produces an output signal.

References Cited
UNITED STATES PATENTS

| | | | |
|---|---|---|---|
| 3,340,462 | 9/1967 | Ebersohl | 323—43.5 |
| 3,388,319 | 6/1968 | Paynter | 323—43.5 |
| 3,466,530 | 9/1969 | Matzl | 323—43.5 |

J D MILLER, Primary Examiner

G. GOLDBERG, Assistant Examiner

UNITED STATES PATENT OFFICE
CERTIFICATE OF CORRECTION

Patent No. 3,531,713            Dated    September 29, 1970

Inventor(s)   Leon Joseph Goldberg et al.

It is certified that error appears in the above-identified patent and that said Letters Patent are hereby corrected as shown below:

Column 9, line 24, after "ductive" cancel the rest of the line; line 34, "condition" should read -- conduction --.

Signed and sealed this 26th day of January 1971.

(SEAL)
Attest:

EDWARD M. FLETCHER, JR.           WILLIAM E. SCHUYLER, JR.
Attesting Officer                 Commissioner of Patents